March 19, 1968  G. N. G. GUIDI  3,373,606

MULTIPURPOSE WIND INSTRUMENT

Filed Oct. 13, 1965  7 Sheets-Sheet 1

INVENTOR.
BY
Attorney

March 19, 1968    G. N. G. GUIDI    3,373,606

MULTIPURPOSE WIND INSTRUMENT

Filed Oct. 13, 1965    7 Sheets-Sheet 2

INVENTOR.
BY
Attorney

United States Patent Office 3,373,606
Patented Mar. 19, 1968

3,373,606
MULTIPURPOSE WIND INSTRUMENT
Guido Novello Guidelli Guidi, c/o SIAP, Via Massarenti 412/2°, Bologna, Italy
Filed Oct. 13, 1965, Ser. No. 495,583
Claims priority, application Italy, Oct. 14, 1964, 7,382/64
16 Claims. (Cl. 73—189)

ABSTRACT OF THE DISCLOSURE

A wind sensing and indicating arrangement for providing information with regard to the parameters of wind. A propeller or similar wind-responsive object is located in the path of the wind and rotated thereby. This rotation is mechanically transmitted to electrical generators in which voltages are induced as a result of this mechanical rotation due to the action of the wind. One such electrical generator supplies an output signal proportional to the velocity of the wind. Another or second electrical generator provides an output signal representative of the wind direction. A third electrical generator transmits an output signal indicative of the duration of time of the action of the wind. Through these three electrical generators, therefore, the parameters of the wind are specified. All three electrical generators are driven by a common shaft by the wind sensing or wind-responsive member. Compensating elements are included in the circuitry interconnecting the electrical generators with corresponding indicators, so as to assure precise indications and readings. All electrical signals and all energy required for the operation of the instrument, of the present invention, is supplied only by the wind. No external power supplies are used for the purpose of operating any of the electrical generators or indicators associated with the outputs of the generators.

The present invention relates to a multipurpose wind instrument. More particularly, the invention relates to a multipurpose wind instrument for measuring wind velocity, wind direction and wind flow.

In known types of wind instrument an external source of energy such as, for example, a battery, is utilized to power the instrument. The utilization of an external source of energy creates the strong possibilities of power failure and considerable interference or noise which produce inaccurate measurements.

The principal object of the present invention is to provide a new and improved multipurpose wind instrument.

An object of the present invention is to provide a multipurpose wind instrument which measures wind velocity, wind direction and wind flow with accuracy, efficiency, effectiveness and reliability.

Another object of the present invention is to provide a multipurpose wind instrument which is powered by the wind.

Another object of the present invention is to provide a multipurpose wind instrument which is simple in structure, compact and economical in manufacture and operation.

In accordance with the present invention, a multipurpose wind instrument comprises a first electrical generator positioned in the path of the wind and energized by the wind for providing an electrical signal corresponding to wind velocity. A second electrical generator positioned in the path of the wind is energized by the wind for providing an electrical signal corresponding to wind direction. A third electrical generator positioned in the path of the wind is energized by the wind for providing an electrical signal corresponding to wind flow. The electrical signals from the first, second and third electrical generators are provided simultaneously, via electrical conductors, to an indicator for indicating wind velocity, wind direction and wind flow in response to the electrical signals.

In order that the present invention may be readily carried into effect, it will now be described with reference to the accompanying drawings, wherein.

Figure 1:
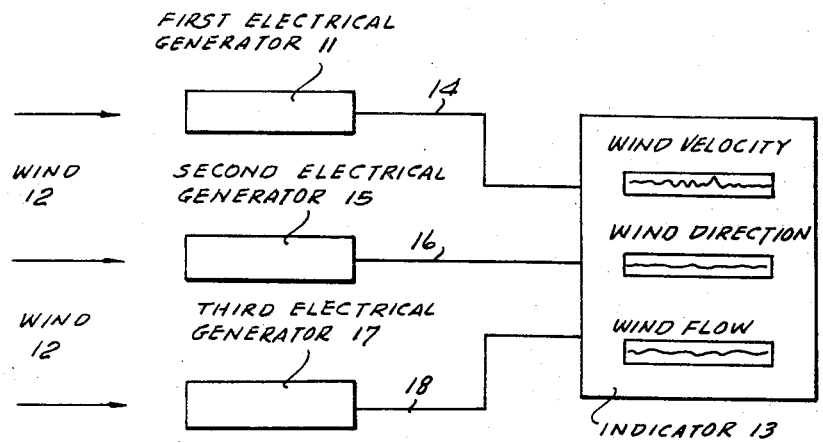
FIG. 1 is a simplified block diagram of an embodiment of the multipurpose wind instrument of the present invention.

In the simplified block diagram of FIG. 1, a first electrical generator 11 is positioned in the path of the wind 12 and is energized by said wind for providing an electrical signal corresponding to the wind velocity. The electrical signal corresponding to the wind velocity is supplied to an indicator 13 via an electrical conductor 14 connecting the first electrical generator 11 to said indicator. A second electrical generator 15 is positioned in the path of the wind 12 and is energized by said wind for providing an electrical signal corresponding to the wind direction. The electrical signal corresponding to the wind direction is supplied to the indicator 13 via an electrical conductor 16 connecting the second electrical generator 15 to said indicator. A third electrical generator 17 is positioned in the path of the wind 12 and is energized by said wind for providing an electrical signal corresponding to the wind flow. The electrical signal corresponding to the wind flow is supplied to the indicator 13 via an electrical conductor 18 connecting the third electrical generator 17 to said indicator.

The indicator 13 indicates wind velocity, wind direction and wind flow in response to the electrical signals from the first, second and third electrical generators 11, 15 and 17, respectively. The indications of the indicator 13 are simultaneous since the electrical signals are provided simultaneously by the first, second and third electrical generators. The first, second and third electrical generators 11, 15 and 17 may be combined in a single electrical generating unit, if desired, and are preferably positioned in a single housing.

Figure 2:
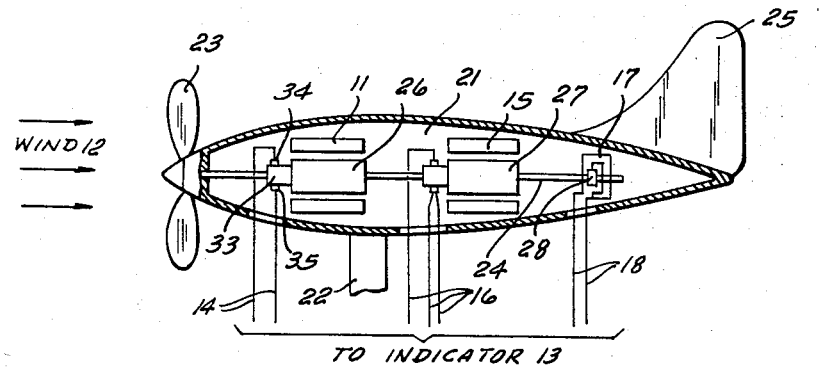
FIG. 2 is a simplified view, partly in section, of an embodiment of the multipurpose wind instrument of the present invention.

FIG. 2 shows a housing 21 positioned in the path of the wind 12 and suitably mounted on a support 22 for free rotation about the axis of said support. The housing 21 has a propeller 23 or other suitable wind responsive device mounted at its nose on a shaft 24 which is suitably mounted in said housing for rotation. A vane 25 extends from the housing 21 and directs said housing into the wind 12.

The first electrical generator 11, the second electrical generator 15 and the third electrical generator 17 are positioned in the housing 21. The rotors 26, 27 and 28 of the first, second and third electrical generators 11, 15 and 17, respectively, are coaxially mounted in the shaft 24 and rotate with said shaft. The wind rotates the propeller 23, the propeller rotates the shaft 24 and the rotors 26, 27 and 28 rotate so that the first, second and third electrical generators 11, 15 and 17 generate electrical signals corresponding to the wind velocity, the wind direction and the wind flow, respectively.

Figure 3:
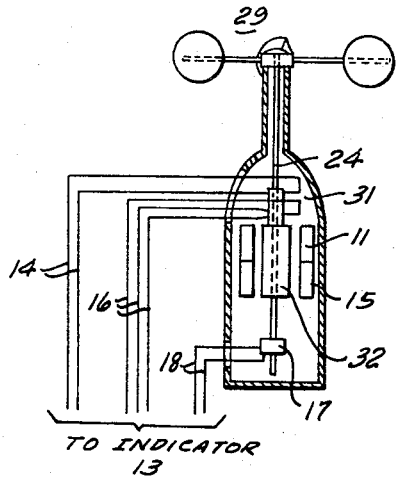
FIG. 3 is a simplified view, partly in section, of another embodiment of the multipurpose wind instrument of the present invention.

In FIG. 3, the first, second and third electrical generators 11, 15 and 17 are combined in a single electrical generator unit having a common rotor 32 and adjacent stator winding sections. In the embodiment of FIG. 3, a disk-type wind-responsive device 29 is mounted at the head of the housing 31 on a shaft 24.

Figure 4:
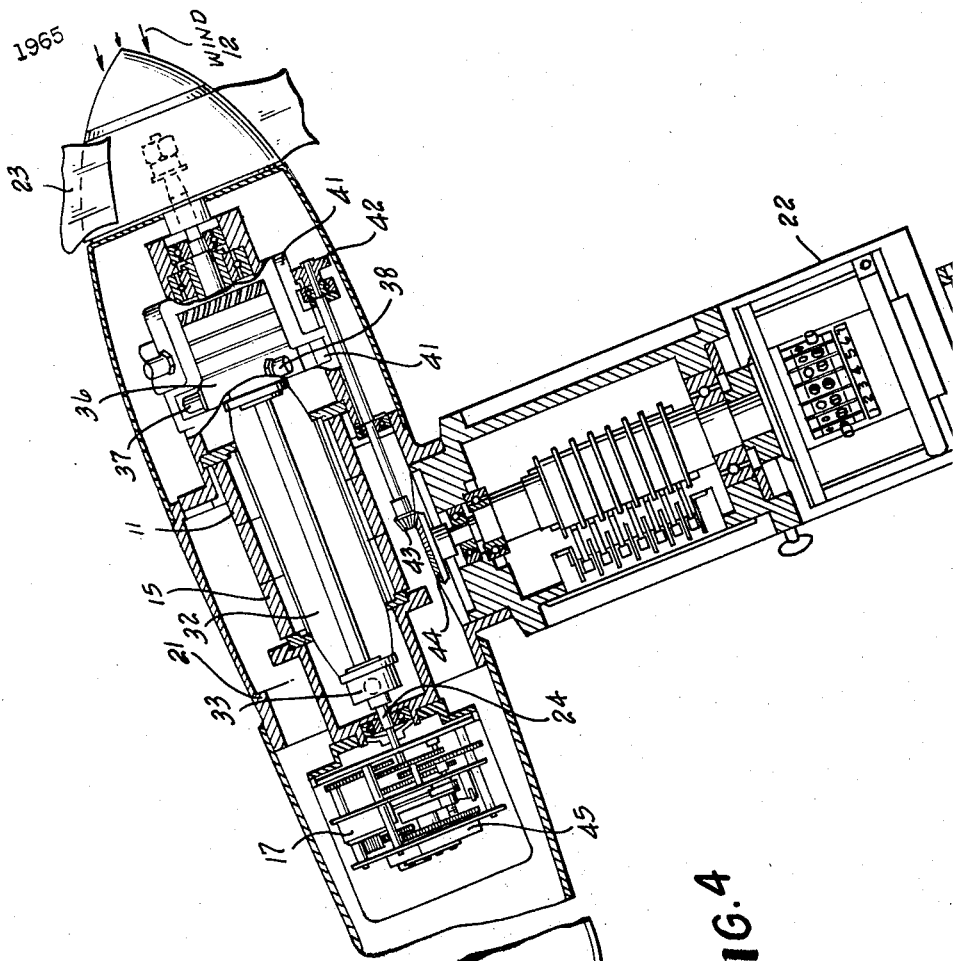
FIG. 4 is a cutaway view, partly in section, of an embodiment of the multipurpose wind instrument of the present invention.

In FIG. 4, which is a cutaway view, partly in section, of an embodiment of the multipurpose wind instrument of the present invention, the first, second and third electrical generators 11, 15 and 17 are combined in a single electrical generator unit, as in FIG. 3, and are positioned in the housing 21 of FIG. 2. The single electrical generator unit has a common rotor 32 and adjacent stator winding sections.

The first electrical generator 11 has a commutator 33 and two brushes 34 and 35 (FIG. 2) positioned in diametric opposition to each other. The brushes 34 and 35 of the first electrical generator 11 provide an electric current which is proportioned to the speed of rotation of the rotor 32 and thus corresponds to the velocity of the wind 12. The electric current corresponding to the wind velocity is supplied via the electrical conductors 14 (FIG. 2) to the indicator 13 (FIG. 1).

The second electrical generator 15 has a commutator 36, which is a usual type of commutator as is the commutator 33 of the first electrical generator 11, such as, for example, a split ring commutator, and three brushes 37, 38 and 39 (not shown) positioned at 120 degrees from each other. The brushes 37, 38 and 39 of the second electrical generator 15 are supported by a sleeve or ring 41 which is positioned coaxial with the commutator 33 around said commutator and in spaced relation therefrom with the brushes in electrical contact with the said commutator.

The brush-supporting sleeve or ring 41 is rotated by a gear chain 42, 43, 44 in the direction of the wind 12 since the support 22 is stationary and fixed in position and the housing 21 rotates about the axis of said housing in the direction of the wind due to the vane 25 which directs said housing into the wind. The housing 21 is mounted on the support 22 for rotation about the axis of said support, so that as the gear 44 rotates with said housing, the bevel type gear 43 rotates and rotates the ring 41 via the gear 42.

The brushes 37, 38 and 39 of the second electrical generator 15 provide an electric current which is proportional to the direction of the wind. The electric current corresponding to the wind direction is supplied via the electrical conductors 16 (FIG. 2) to the indicator 13 (FIG. 1).

The third electrical generator 17 has a spring 45 of substantially spiral type having one end affixed to the shaft 24. As the shaft 24 is rotated by the wind 12 via the propeller 23, the spring 45 winds up, until after the shaft has rotated a predetermined number of revolutions the spring is fully wound. The predetermined number of revolutions of the spring 45 correspond to a determined wind flow, so that after the spring is fully wound, and then is permitted to unwind, it energizes the third electrical generator 17 into which it is coupled, for the same predetermined period of time. The third electrical generator 17 thus produces an electric current for the predetermined period of time which corresponds to the flow or run of the wind.

The spring 45 is preferably coupled to the shaft 24 via a gear reduction system and the predetermined period of time for winding and unwinding of the spring is the same. The third electrical generator 17 provides an electric current which corresponds to a determined wind flow such as, for example, 1 kilometer, 5 kilometers, 2 miles or the like. The electric current corresponding to the wind flow is supplied via the electrical conductors 18 (FIG. 2) to the indicator 13 (FIG. 1).

Figure 5:
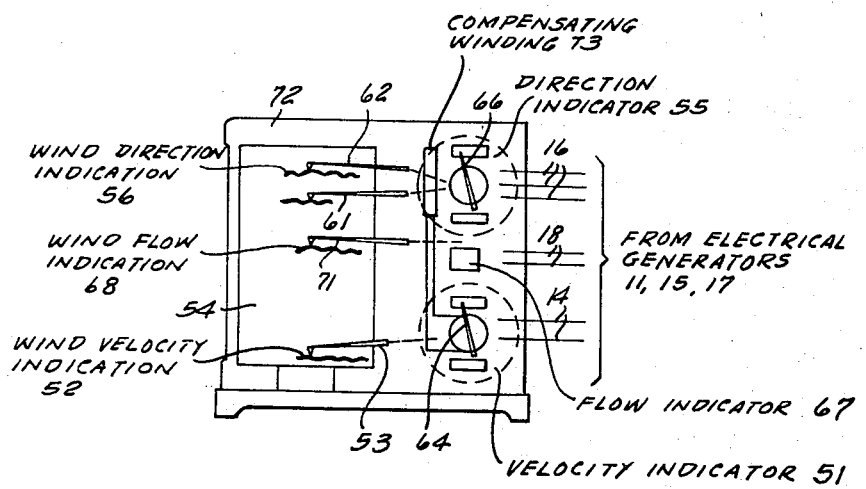
FIG. 5 is a simplified view, partly in section, of an embodiment of the indicator 13 of the multipurpose wind instrument of the present invention.
Figure 6:
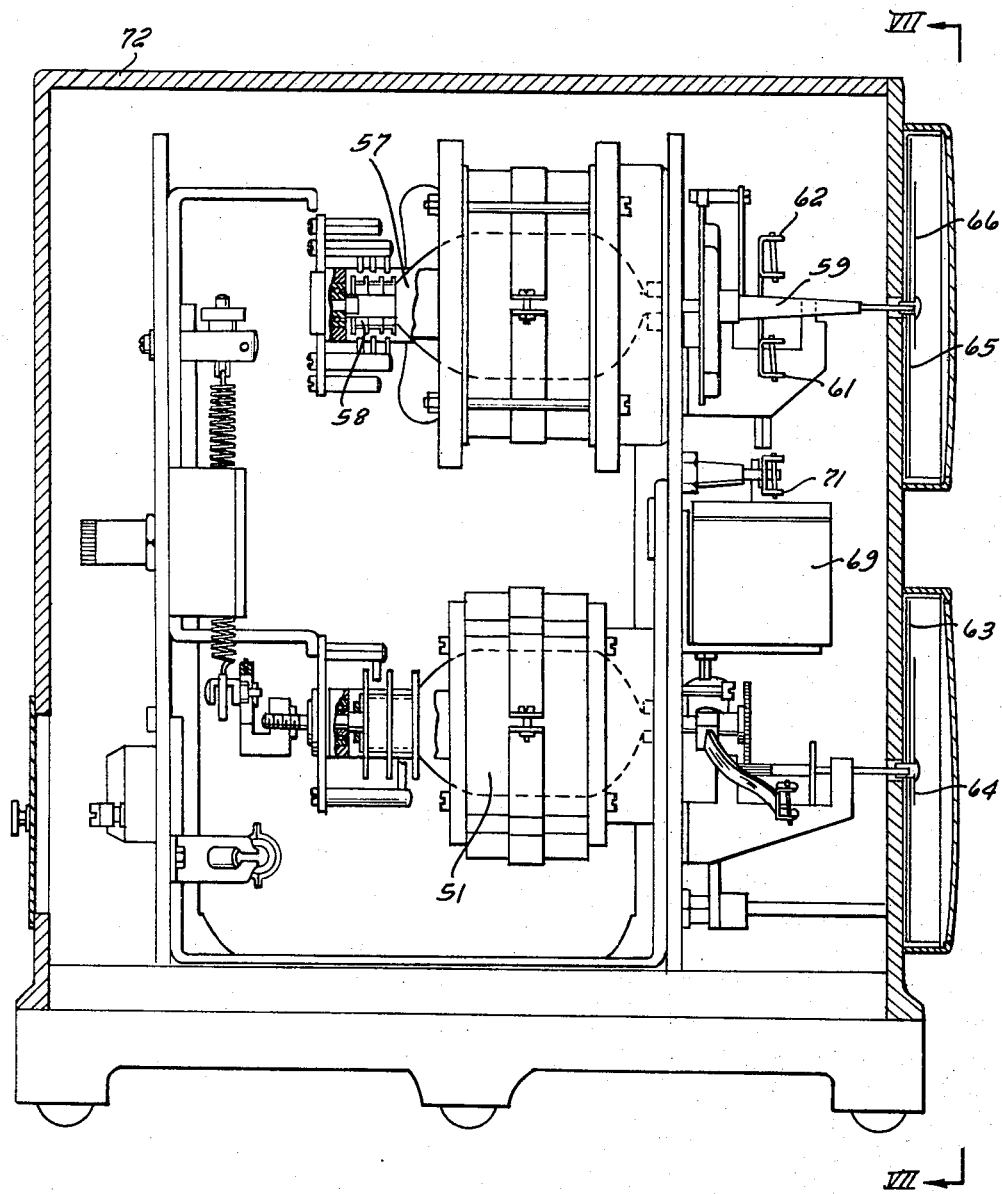
FIG. 6 is a view, partly in section, of an embodiment of the indicator 13 of the multipurpose wind instrument of the present invention.
Figure 7:
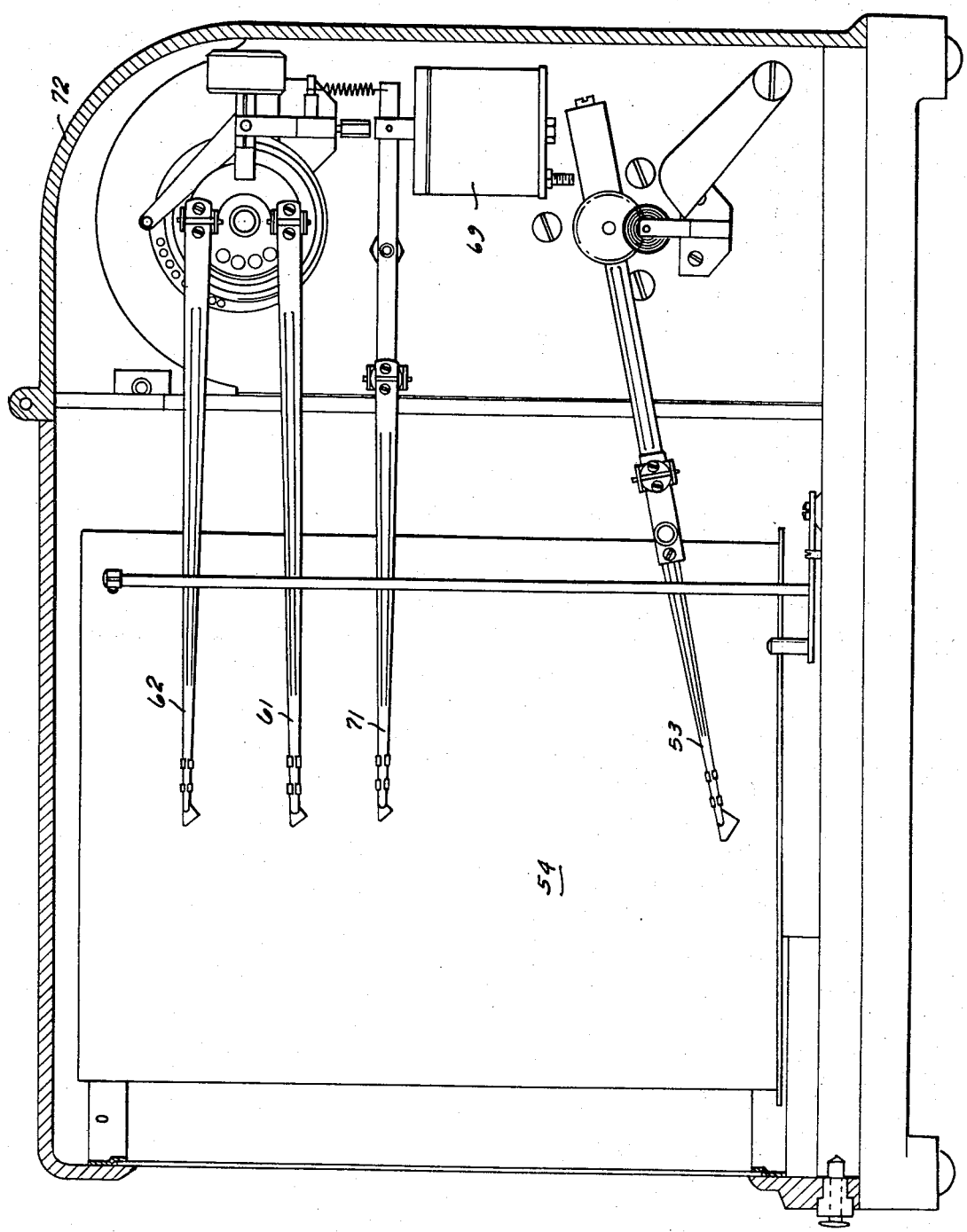
FIG. 7 is a view, partly in section, taken along the lines VII—VII of FIG. 6.
Figure 8:
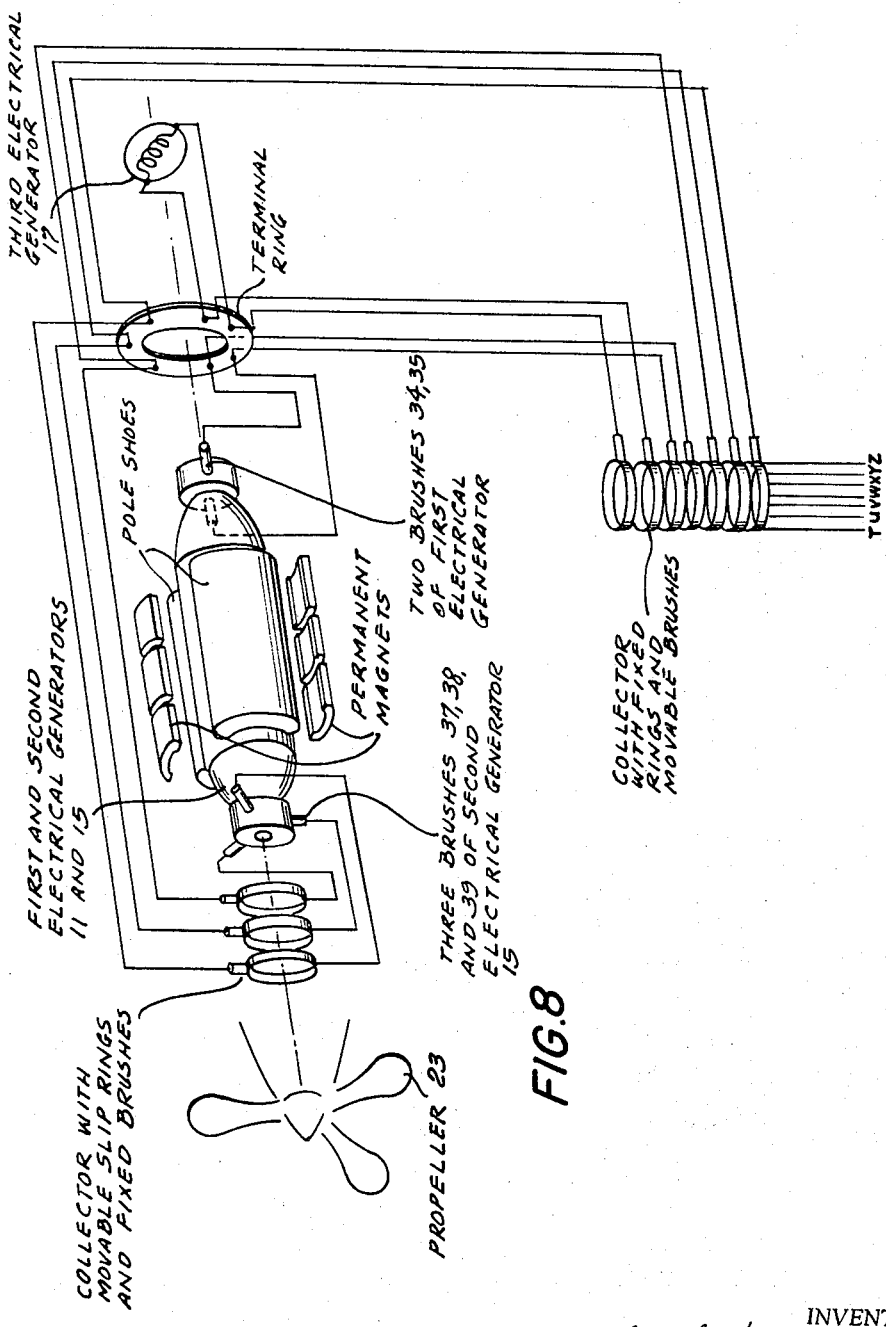
FIG. 8 is an exploded view and circuit diagram of the embodiment of FIG. 4.
Figure 9:
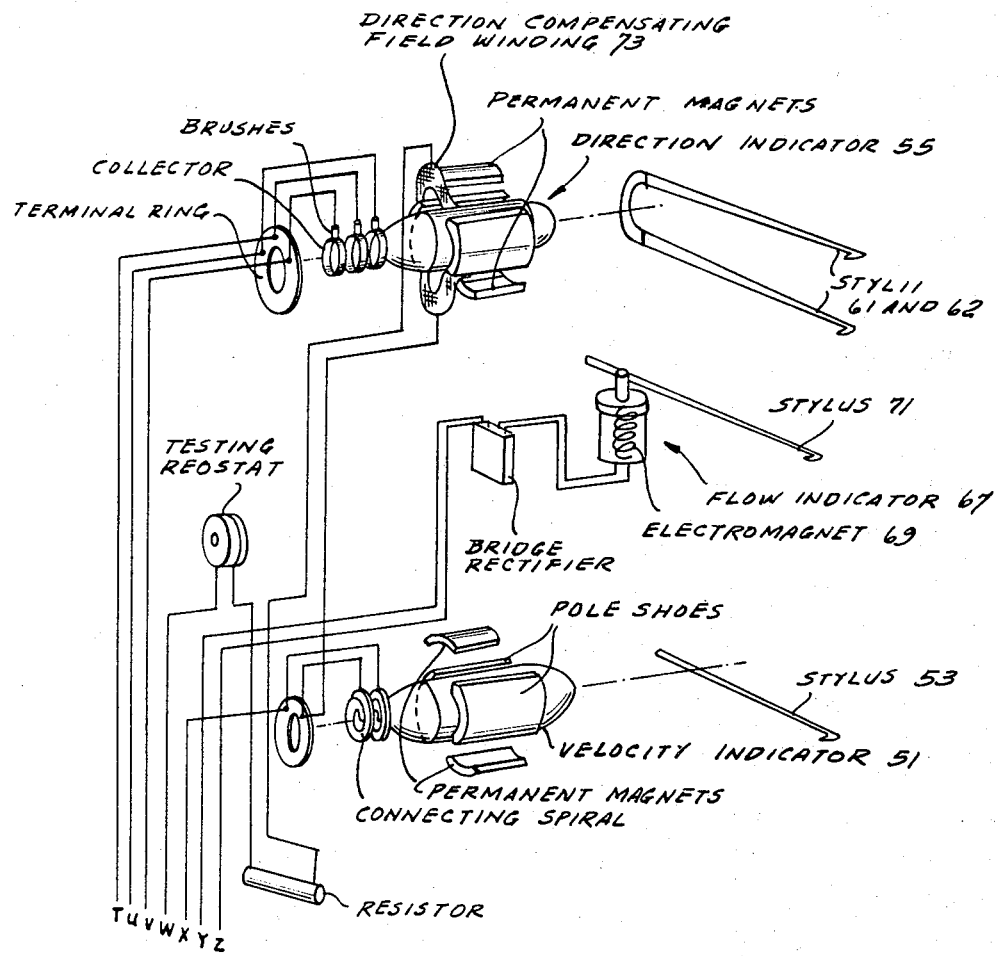
FIG. 9 is an exploded view and circuit diagram of the embodiment of FIG. 6.

The electric currents corresponding to wind velocity, wind direction and wind flow, respectively, in the electrical conductors 14, 16 and 18, respectively, connected to the brushes 34 and 35, the brushes 37, 38 and 39 and the third electrical conductors to the indicator 13 (FIG. 1). The indicator 13, as shown in FIGS. 5 and 6, comprises a velocity indicator 51 which functions to provide a wind velocity indication 52 in response to the current supplied to it via the electrical conductors 14. The velocity indicator 51 comprises a galvanometer device of known type and an inking or other type of marking stylus 53 which is driven by said galvanometer device. The marking stylus 53 marks a record medium 54, which is slowly moved or fed past said stylus, with the wind velocity indication 52.

The indicator 13, as shown in FIGS. 5 and 6, also comprises a direction indicator 55 which functions to provide a wind direction indicator 56 in response to the current supplied to it via the electrical conductors 16. The direction indicator 55 comprises a rotor 57 (FIG. 6) and three stator windings (not shown) positioned at 120 degrees from each other. The current supplied via the electrical conductors 16 is supplied to the three stator windings via a commutator 58 (FIG. 6). The rotor 57 is positioned in a magnetic field, produced by the stator windings, which is fixed in direction transverse to the axis of rotation thereof.

The currents supplied via the three electrical conductors 16 to the three stator windings of the direction indicator 55 produce a resultant field which orients the rotor 57 into alignment with a direction in which the resultant magnetic field is parallel to the fixed magnetic field. Thus, any rotation of the ring or sleeve 41 of the second electrical generator 15, determined by the wind direction, produces the same rotation of the rotor 57 of the direction indicator 55 by producing the same rotation of the resultant magnetic field in aligning said resultant field with the fixed magnetic field. There is thus identity between the ring 41 and the rotor 57; the rotor 57 moving to the same angular position under the control of the movement of the ring 41.

The direction indicator 55 comprises a shaft 59 (FIG. 6) which rotates with the rotor 57 and a marking stylus 61 which is mounted on and driven by said shaft. An additional marking stylus 62 may be mounted on and driven by the shaft 59 (FIG. 6). The stylii 61 and 62 mark the record medium 59. The wind velocity may be read directly on a meter 63 by movement of an indicator needle 64 mounted for rotation with the galvanometer device 51 and the wind direction may be read directly on a meter 65 by movement of an indicator needle 66 mounted on the shaft 59 for rotation with the rotor 57 of the direction indicator (FIG. 6).

The indicator 13, as shown in FIGS. 5 and 6, further comprises a flow indicator 67 which functions to provide a wind flow indication 68 in response to the current pulses or current supplied to it via the electrical conductors 18. The flow indicator 67 comprises an electromagnet 69 and a marking stylus 71 suitably mounted for rotation by said electromagnet. The stylus 71 marks the record medium 54. An indicator needle of a meter (not shown) may be rotated under the control of the electromagnet 69, if desired.

The velocity, direction and flow indicators 51, 55 and 67 are positioned in a housing 72. The housing 72 may be positioned at a distance from the housing 21. Under ordinary operating conditions, the housing 21 is positioned at a weather station such as, for example, on the roof of a building, and the housing 72 is positioned in the office of the weather bureau such as, for example, in the building.

The second electrical generator 15 which provides the wind direction signals is susceptible to armature reaction, which is characteristics of DC generators. The armature reaction is evidenced by an angular displacement of the impressed magnetic field. The angular displacement increases with increasing current supplied to the direction indicator 55, and therefore increases with increasing wind velocity, and produces error in the wind direction indication 56. The armature reaction is counteracted by displacement of the fixed magnetic field of the direction indicator 55 by an angle equal and opposite to that of the displacement caused by the armature reaction.

The counteracting or compensating displacement of the magnetic field is provided by a compensating winding 73 positioned in the direction indicator 55 (FIG. 5). The compensating winding 73 is supplied by current from the first electrical generator 11 which provides the wind velocity signals, and produces a magnetic field which is oriented at 90 degrees to the fixed magnetic field. The compensating winding 73 thus provides a magnetic field connection which is the same as the displacement of the magnetic field caused by the armature reaction and thereby eliminates any error.

While the invention has been described by means of specific examples and in specific embodiments, I do not wish to be limited thereto, for obvious modifications will occur to those skilled in the art without departing from the spirit and scope of the invention.

What I claim is:

1. A multipurpose wind instrument, comprising:
   first electrical generating means positioned in the path of the wind and energized by the wind for providing an electrical signal corresponding to wind velocity;
   second electrical generating means positioned in the path of the wind and energized by the wind for providing an electrical signal corresponding to wind direction;
   third electrical generating means positioned in the path of the wind and energized by the wind for providing an electrical intermittent signal proportional to a predetermined volume of air passing through said instruments, said intermittent signal corresponding to wind flow;
   indicating means for indicating wind velocity, wind direction and wind flow in response to electrical signals from said first, second and third electrical generating means; and
   electrical conducting means connecting each of the said first, second and third electrical generating means to said indicating means, whereby said wind is the only source of energy for energizing and operating said first, second and third electrical generating means and said indicating means.

2. A multipurpose wind instrument as claimed in claim 1, wherein said first, second and third electrical generating means simultaneously provide electrical signals.

3. A multipurpose wind instrument as claimed in claim 1, wherein said first, second and third electrical generating means are combined in a single electrical generating unit.

4. A multipurpose wind instrument as claimed in claim 1, wherein said first electrical generating means comprises stator winding means, rotor means, commutator means coupled to said rotor means and brush means cooperating with said commutator means, and further comprising drive means coupled to said rotor means and extending into the path of the wind for rotating said rotor means at wind velocity whereby said brush means provide an electrical signal corresponding to wind velocity.

5. A multipurpose wind instrument as claimed in claim 1, wherein said second electrical generating means comprises stator winding means, rotor means, rotor driving means secured to said rotor means and located in the path of the wind so as to be driven by the action of the wind and rotate thereby said rotor means, commutator means coupled to said rotor means, a supporting ring coaxially mounted around said commutator means in spaced relation thereto, and a plurality of brushes mounted on said supporting ring in cooperative engagement with said commutator means, and further comprising coupling means coupled to said supporting ring for rotating said brushes in correspondence with wind direction whereby said brushes provide an electrical signal corresponding to wind direction.

6. A multipurpose wind instrument as claimed in claim 1, wherein said third electrical generating means comprises electrical generating means and spring means coupled to said electrical generating means for energizing said electrical generating means, and further comprising drive means coupled to said spring means and extending into the path of the wind for winding up said spring means for a predetermined number of revolutions of said drive means in a predetermined period of time corresponding to a determined wind flow whereby when said spring means unwinds it energizes said electrical generating means for said predetermined period of time to provide an electrical signal corresponding to wind flow.

7. A multipurpose wind instrument as claimed in claim 1, further comprising housing means positioned in the path of the wind, fixed supporting means having a support axis supporting said housing means for rotation about said support axis, directing means mounted on said housing means for directing said housing means into the wind and wind-responsive means mounted for rotation on said housing means in the path of the wind, each of said first, second and third electrical generating means being positioned in said housing means.

8. A multipurpose wind instrument as claimed in claim 7, wherein said first electrical generating means comprises stator winding means, rotor means, commutator means coupled to said rotor means and brush means cooperating with said commutator means, and further comprising drive means coupled to said rotor means and to said wind-responsive means for rotating said rotor means at wind velocity whereby said brush means provide an electrical signal corresponding to wind velocity.

9. A multipurpose wind instrument as claimed in claim 8, wherein said second electrical generating means comprises stator winding means, rotor means secured to said wind-responsive means so as to be be rotated through the rotational action of said wind-responsive means, commutator means coupled to said rotor means, a supporting ring coaxially mounted around said commutator means in spaced relation thereto, and a plurality of brushes mounted on said supporting ring in cooperative engagement with said commutator means, and further comprising gear means mounted in said housing means for rotation with said housing means and coupling means coupled to said supporting ring and to said gear means for rotating said brushes in correspondence with wind direction, whereby said brushes provide an electrical signal corresponding to wind direction.

10. A multipurpose wind instrument as claimed in claim 11, wherein said third electrical generating means comprises electrical generating means and spring means coupled to said electrical generating means for energizing said electrical generating means, and further comprising drive means coupled to said spring means and to said wind-responsive means for winding up said spring means for a predetermined number of revolutions of said drive means in a predetermined period of time corresponding to a determined wind flow whereby when said spring means unwinds it energizes said electrical generating means for said predetermined period of time to provide an electrical signal corresponding to wind flow.

11. A multipurpose wind instrument as claimed in claim 12, wherein said indicating means includes compensating means connected to the electrical conducting means transmitting the output signal from said first electrical generating means and cooperating with the indicating means for indicating wind direction to compensate for variations in the output signal of said second electrical generating means due to variations of the wind velocity from a predetermined magnitude.

12. A multipurpose wind instrument as claimed in claim 15, wherein the indicating means for indicating wind direction utilizes a fixed magnetic field which is angularly displaced as a result of the signal output of said second electrical generating means, and said compensating means comprises a winding producing a magnetic field at 90 degrees to said fixed magnetic field.

13. A multipurpose wind instrument as claimed in claim, 7 wherein said second electrical generating means comprises stator winding means, rotor means secured to said wind-responsive means so as to be rotated through the rotational action of said wind-responsive means, commutator means coupled to said rotor means, a supporting ring coaxially mounted around said commutator means in spaced relation thereto, and a plurality of brushes mounted on said supporting ring in cooperative engagement with said commutator means, and further comprising gear means mounted in said housing means for rotation with said housing means and coupling means coupled to said supporting ring and to said gear means for rotating said brushes in correspondence with wind direction, whereby said brushes provide an electrical signal corresponding to wind direction.

14. A multipurpose wind instrument as claimed in claim 7, wherein said third electrical generating means comprises electrical generating means and spring means coupled to said electrical generating means energizing said electrical generating means, and further comprising drive means for winding up said spring means for a predetermined number of revolutions of said drive means in a predetermined period of time corresponding to a determined wind flow whereby when said spring means unwinds it energizes said electrical generating means for said predetermined period of time to provide an electrical signal corresponding to wind flow.

15. A multipurpose wind instrument as claimed in claim 1, wherein said indicating means for wind direction includes compensating means connected to the electrical conducting means transmitting the output of said first electrical generating means to said wind velocity indicating means and cooperating with the indicating means for indicating wind direction to compensate for variations in the output signal of said second electrical generating means due to variations of the wind velocity from a predetermined magnitude.

16. A multipurpose wind instrument as claimed in claim 13, wherein the indicating means for indicating wind direction utilizes a fixed magnetic field which is angularly displaced as a result of the signal output of said second electrical generating means, and said compensating means comprises a winding producing a magnetic field at 90 degrees to said fixed magnetic field.

References Cited

UNITED STATES PATENTS

| | | | |
|---|---|---|---|
| 2,375,227 | 5/1945 | Hillman | 73—189 |
| 2,820,363 | 1/1958 | McConica | 73—189 |
| 2,923,861 | 2/1960 | Colt | 73—189 X |
| 3,119,260 | 1/1964 | Karmin | 73—189 |

RICHARD C. QUEISSER, *Primary Examiner.*

JAMES J. GILL, *Examiner.*

J. W. MYRACLE, *Assistant Examiner.*